United States Patent [19]
Akushsky et al.

[11] 4,064,400
[45] Dec. 20, 1977

[54] DEVICE FOR MULTIPLYING NUMBERS REPRESENTED IN A SYSTEM OF RESIDUAL CLASSES

[76] Inventors: Izrail Yakovlevich Akushsky, Volokolamskoe shosse, 1, kv. 119; Vladimir Mikhailovich Burtsev, prospekt Vernadskogo, 111, kv. 114, both of Moscow; Alken Nurmagambetovich Kazangapov, ulitsa Vinogradova, 61/67; Ivan Timofeevich Pak, prospekt 50-letia Oktyabrya, 82/90, kv. 27, both of Alma-Ata, all of U.S.S.R.

[21] Appl. No.: 668,611

[22] Filed: Mar. 19, 1976

[30] Foreign Application Priority Data

Mar. 25, 1975 U.S.S.R. ............................. 2114928

[51] Int. Cl.² ............................................... G06F 7/52
[52] U.S. Cl. .................................................... 364/746
[58] Field of Search ........................................ 235/156

[56] References Cited

U.S. PATENT DOCUMENTS

| 3,167,645 | 1/1965 | Hoffmann et al. | 235/156 |
| 3,191,011 | 6/1965 | Baugh et al. | 235/156 |

OTHER PUBLICATIONS

H. L. Garner "The Residue Number System" *IRE Trans. on Electronic Computers* June 1959, pp. 140–147.
I. Flores *The Logic of Computer Arithmetic* Prentice--Hall, Inc. 1963, pp. 447–451.

*Primary Examiner*—David H. Malzahn
*Attorney, Agent, or Firm*—Lackenbach, Lilling & Siegel

[57] ABSTRACT

According to the invention, a device for multiplying numbers represented in the system of residual classes comprises an add-shift unit having its output connected to a product bus, while its inputs are coupled to a multiplicand reducer, a multiplier generator and an inverter, an input of said inverter being connected to the output of the multiplier generator and to one input of the multiplicand reducer, and an input of said inverter being connected to a multiplicand bus, the input of the multiplier generator being connected to a multiplier bus.

9 Claims, 9 Drawing Figures

DEVICE FOR MULTIPLYING NUMBERS REPRESENTED IN A SYSTEM OF RESIDUAL CLASSES

The present invention relates to arithmetic devices used in computers, and more specifically to devices for multiplying numbers represented in the system of residual classes.

It is well known that multiplication along with division is the most complicated and time-consuming of all elementary arithmetical operations performed in a computer. This is due to the fact that most devices currently operating in radix notations are based on a principle which requires a substantial amount of hardware and, since the constituent microoperations are performed sequentially, it takes too much time to perform multiplication.

Improvements in hardware enhance the efficiency of computation insignificantly without obviating the principal difficulties inherent in this arithmetical operation.

A drastically new approach to facilitate arithmetical operations in computers is using number systems other than radix notations, in particular, the system of residual classes.

This system is characterized in that a number is divided into separate elements which can be processed independently and in parallel.

In the system of residual classes, a decimal number A is represented as an aggregate of residues resulting from the decimal A being divided by each of coprime numbers $p_1, p_2, \ldots, p_i, \ldots, p_n$. If we denote by $\alpha_i$ the residue from the division of the decimal A by $p_i$ with $i = 1, 2, \ldots, n$, the decimal A will take the following form in the system of residual classes:

$$A = (\alpha_1, \alpha_2, \ldots, \alpha_i, \ldots, \alpha_n) \quad (1)$$

The coprime numbers $p_1, p_2, \ldots, p_n$ are bases of the system of residual classes.

Number P equal to the product of all bases of the system of residual classes will be referred to as the limit value of the range of the number system:

$$P = p_1 \cdot p_2 \cdot \ldots \cdot p_n \quad (2)$$

For example, there can be utilized a system of residual classes including three bases, i.e. $n = 3$, namely:

$$p_1 = 3; p_2 = 5; p_3 = 7$$

Then, the limit value of the range of the system of residual classes will be $P = 3 \cdot 5 \cdot 7 = 105$.

One of the criteria of selecting bases of the number system is the requirement that their product should be greater than the highest multiplier and multiplicand which one would use on in this problem.

Consider now the decimal number $A = 68$ in the system of residual classes. By sequentially dividing $A = 68$ by each base, we will obtain residues $\alpha_1 = 2, \alpha_2 = 3$, and $\alpha_3 = 5$.

Hence, the decimal number $A = 68$ in the system of residual classes will take the form:

$$A = (2,3,5)$$

It should be noted at this point that the limit value $p$ of the range of the number system is representative of a set of numbers (multipliers and multiplicands) which can be unambiguously represented in the system of residual classes through these bases.

In our example, the range of variation of the numbers unambiguously represented in the system of residual classes is 0 to 105, i.e. the highest number (multiplier and multiplicand) unambiguously represented in the system of residual classes is equal to 104. In other words, for each number in the range 0 to 104 there corresponds a single set of residues. For example, number 21 and number 126, which does not belong to the range 0 to 105 in the system of residual classes under consideration, will be represented in the same way:

$$21 = (0,1,0)$$

$$126 = (0,1,0)$$

The operation of finding the residue from the division of A by base $p_i$ of the number system can be written as $$A = \alpha_i \bmod p_i \quad (3)$$

The system of residual classes under consideration is best adapted for reasonable (modular) operations which can be performed within a single computer microstep.

Suppose we are given two operands A and B represented in the system of residual classes as:

$$A = (\alpha_1, \alpha_2, \ldots, \alpha_n),$$

$$B = (\beta_1, \beta_2, \ldots, \beta_n), \quad (4)$$

wherein $A = \alpha_i \bmod p_i$ and $B = \beta_i \bmod p_i$, with $i = 1, 2, \ldots, n$.

Then, the result C of any reasonable operation (addition, subtraction, multiplication) performed on operands A and B can be written as follows:

$$C = A*B = (\gamma_1, \gamma_2, \ldots, \gamma_n), \quad (5)$$

wherein $\gamma_i = \alpha_i * \beta_i \bmod p_i$ with $i = 1,2, \ldots, n$, and * stands for one of the following operations: additions, substraction or multiplication.

Reasonable operations may also include division of the operand A by operand B, provided A is divisible by B without residue:

$$C = A/B = (\gamma_1, \gamma_2, \ldots, \gamma_n), \quad (6)$$

wherein $\gamma_i = \gamma_i/\beta_i \bmod p_i$ with $i = 1,2, \ldots, n$.

As can be inferred from the above, reasonable operations are performed simultaneously and in parallel with respect to each one of the number system bases, with the dissimilar residues of the operands in a reasonable operation being in no way associated in contrast to radix notations. In addition, when reasonable operations are performed in a computer, use is made of tabular arithmetic, which permits the elimination of carry circuits inside bases while performing reasonable operations. This makes it possible, for example, to perform an addition of two operands represented in a system of residual classes within a single computer microstep, which is even theoretically impossible in the case of radix notations.

It should be noted that the result of a reasonable operation will be correct if the operands participating in the operation and the result belong both to the range 0 to P, i.e. are less than the limit value P of the number system.

For example, let us perform, in a system of residual classes with bases $p_1 = 3, p_2 = 5, p_3 = 7$, the following reasonable operations on operands A and B:

1. Add $A = 41 = (2,1,6)$ to $B = 30 = (0,0,2)$:

$\gamma_1 = 2 + 0 = 2 \bmod 3;$ $\gamma_2 = + 0 = 1 \bmod 5;$ $\gamma_3 = 6 + 2 = 8 = 1 \bmod 7.$ Hence, $C = (2,1,1) = 71.$ 2. Subtract $B = 30 = (0,0,2)$ from $A = 41 = (2,1,6)$:

$\gamma_1 = 2 - 0 = 2 \bmod 3;$ $\gamma_2 = 1 - 0 = 1 \bmod 5;$ $\gamma_3 = 6 - 2 = 4 \bmod 7.$ Hence, $C = (2,1,4) = 11.$ 3. Multiply $A = 3 = (0,3,3)$ by $B = 30 = (0,0,2)$:

$\gamma_1 = 0 \cdot 0 = \bmod 3;$ $\gamma_2 = 3 \cdot 0 = 0 \bmod 5;$ $\gamma_3 = 3 \cdot 2 = 6 \bmod 7.$ Hence, $C = (0,0,6) = 90.$ 4. Divide $A = 32 = (2,2,4)$ by $B = 4 = (1,4,4)$:

$\gamma_1 = 2/1 = 2 \bmod 3;$ $\gamma_2 = 2/4 = (2=2\cdot 5)/4 = 3 \bmod 5;$ $\gamma_3 = 4/4 = 1 \bmod 7.$ Hence, $C = (2,3,1) = 8.$ 5. Multiply $A = 41 = (2,1,6)$ by $B = 30 = (0,0,2)$:

$\gamma_1 = 2 \cdot 0 = 0 \bmod 3;$ $\gamma_2 = 1 \cdot 0 = 0 \bmod 5;$ $\gamma_3 = 6 \cdot 2 = 12 = 5 \bmod 7.$ Hence, $C = (0,0,5) = 75.$ In fact, the product $C = A \cdot B = 41 \cdot 30 = 1230.$ Thus, the result of the reasonable operation of multiplication is not correct, since the product C is greater than the limit value $P = 105$ of the range of the system of residual classes.

Therefore, when arbitrary operands represented in the system of residual classes are multiplied, one should solve the problem of finding the product without imposing any limitations on the values of the operands and the product except that they should belong to the range of the system.

In this connection, we introduce the notion of product C' of abridged multiplication:

$$C' = A \cdot B / P \qquad (7)$$

Finding the product C' of abridged multiplication is precisely what must be attained by multiplying operands A and B in the system of residual classes.

In Example 5, the product C' of abridged multiplication of operand $A = 41$ by $B = 30$ is equal to:

$$C' = (41 \cdot 30)/105 = 11$$

Obviously, if the product C of multiplication of A by B is less than the limit value P of the range of the number system, the product C' of abridged multiplication will be equal to zero ($C' = 0$), because the product C lies within the range of the system.

In addition, in machine representation, numbers are normally represented as proper fractions. For the system of residual classes it is most expedient to use the limit value P of the system range as the denominator. In this case, we shall have the following operands:

$$A' = A/P \qquad (8)$$

$$B' = B/P \qquad (9)$$

Then, the product of multiplication of A' by B' can be written as:

$$A' \cdot B' = (A/P) \cdot (B/P) = (A \cdot B)/P^2 = C'/P, \qquad (10)$$

wherein $C' = (A \cdot B)/P$

Thus, the process of multiplying fractions in the system of residual classes boils down to finding the product C' of abridged multiplication of the numerators of the operands A' and B'.

It is well known that to perform the operation of multiplication in the system of residual classes it is not sufficient to know the residues of the multiplicand and multiplier. To multiply, one needs information on the value of a number in a radix notation, e.g. in decimal notation, which is preset either in the form of a rank or by switching over to a number system with mixed bases.

Operations which can only be performed provided information is available on the value of a number in a radix notation are known as nonmodular operations. They also include division and multiplication of fractions and integers, determining the sign of a number and presence of overflow, division by a number system base, etc.

Introduced in the present specification is a position attribute R indicative of the value of a number in radix notation with the subscript of the position attribute R corresponding to the number to which this attribute belongs, i.e. the position attribute of a number Z can be written as $R_Z$.

Calculation of the position attribute R is described below.

It is an object of the present invention to provide a device which can be used for multiplying arbitrary numbers represented in the system of residual classes.

This object is attained by a multiplying device comprising a multiplier generator, intended for sequential generation of the multiplier, having its input connected to a multiplier bus, an inverter having its input connected to the first output of the multiplier generator, a multiplicand reducer, intended for reduction of the multiplicand to the required form, having its first input connected to a multiplicand bus, and an add-shift unit, intended for obtaining the product, having its first input connected to the multiplicand reducer and its output connected to a product bus, according to the invention, the second input of the multiplicand reducer is connected to the output of the multiplier generator for the multipicand represented in the system of residual classes to be transferred to the add-shift unit, the second input of the add-shift unit is connected to the output of the inverter for controlling the operations of addition and shifting of the multiplicand as well as the product, both being represented in the system of residual classes, and the third input of the add-shift unit is connected to the second output of the multiplier generator for controlling transfer of the product to the product bus.

It is expedient that the multiplier generator of the multiplying device should comprise an OR-gate unit having one of its inputs connected to the input of the multiplier generator, a shift unit, intended for shifting the multiplier one information bit to the left, having its input connected to the output of the OR-gate unit and its first output connected to the second input of the OR-gate unit, and a shift register intended for shifting the reduced multiplier, having its input connected to the second output of the shift unit and its outputs connected to the outputs of the multiplier generator.

It is advisable that the shift unit of the multiplying device should comprise a position attribute generator having its input connected to the input of the shift unit, a shift circuit, intended for shifting the multiplier one information bit to the left with the aid of the position attribute, having its first input connected to the input of the shift unit and its second input connected to the output of the position attribute generator, and a comparator circuit, intended for producing a control signal in accordance with the position attribute, having its first input connected to the first output of the shift circuit, its second input connected to the output of the position attribute generator, and its output connected to the second output of the shift unit, the first output of said shift unit being connected to the output of the shift circuit.

It is also advisable that the shift circuit of the multiplier should comprise a decoder group having its input connected to the first input of the shift circuit and its first output connected to the second output of the shift circuit, a position attribute decoder having its input connected to the second input of the shift circuit, and an adder having its first input connected to the second output of the decoder group, its second input connected to the output of the position attribute decoder and its output connected to the second output of the shift circuit.

The add-shift unit of the multiplying device should preferably comprise a modulo adders unit, intended for addition of the multiplicand to the subproduct, both both being represented in the system of residual classes, having one of its inputs connected to the input of the add-shift unit, an OR-gate unit having one of its inputs connected to the output of the modulo adders unit, a first AND-gate unit having its first input connected to the second input of the add-shift unit and its output connected to the second input of the OR-gate unit, a shift unit, intended for shifting the subproduct one information bit to the right, having its input connected to the output of the OR-gate unit, a product register, intended for storing the subproduct and product, having its input connected to the output of the shift unit and its output connected to the second inputs, respectively, of the modulo adders unit and of the first AND-gate unit, and a second AND-gate unit having its first input connected to the output of the product register, its second input connected to the third input of the add-shift unit and its output connected to the output of the add-shift unit.

It is also expedient that the shift unit of the multiplying device should comprise a position attribute generator, intended for calculating the position attribute of the subproduct, having its input connected to the input of the shift unit, a parity generator, intended for determining the parity of the subproduct, having its first input connected to the input of the shift unit and its second input connected to the output of the position attribute generator, and a division unit, intended for dividing the subproduct by the factor of two, having its first input connected to the input of the shift unit, its second input connected to the output of the parity generator and its output connected to the output of the shift unit.

The position attribute generator of the multiplying device should preferably comprise a decoder group having its input connected to the input of the position attribute generator, and a specified modulo adder having its input connected to the output of the decoder group and its output connected to the output of the position attribute generator.

The parity generator of the multiplying device should preferably comprise a memory register intended for storing the number system constants, a group of AND-gates having its first input connected to the first input of the parity generator and its second input connected to the output of the memory register, and a modulo 2 adder having its first input connected to the output of the group of AND-gates, its second input connected to the second input of the parity generator and its output connected to the output of the parity generator.

The present invention makes it possible to develop a new family of computers operating in the system of residual classes.

The circuitry of the proposed multiplying device providing for the use of a number of standard units substantially simplifies the manufacture of the device and, hence, drastically cuts down the costs involved in the manufacture and use of the multiplying device and computer as a whole.

Easy operation and simple structure of the proposed multiplying device appreciably enhances the reliability of the computer.

The invention will now be described in greater detail with reference to a specific embodiment thereof, taken in conjunction with the accompanying drawings, wherein.

Figure 1:
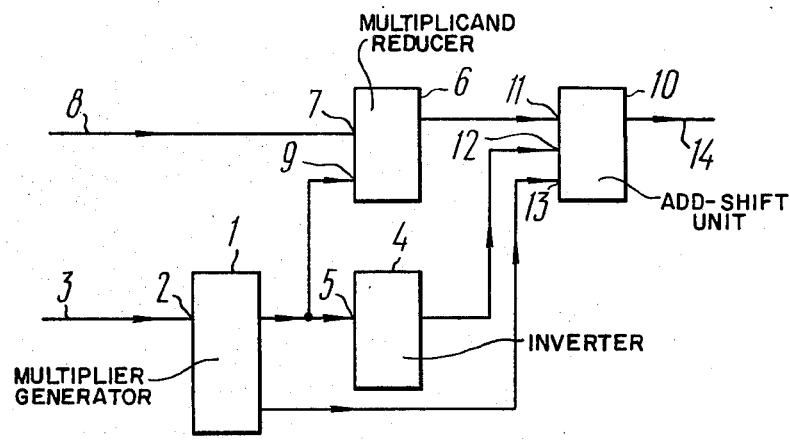
FIG. 1 is a block diagram of a multiplying device according to the invention.

Referring now to FIG 1, the device for multiplying numbers represented in the system of residual classes comprises a multiplier generator 1 whose input 2 is connected to a multiplier bus 3.

The multiplying device also comprises an inverter 4 having its input 5 connected to the first input of the multiplier generator 1.

The multiplying device further comprises a multiplicand reducer 6 with its first input 7 being connected to a multiplicand bus 8 and its second input 9 being connected to the first output of the multiplier generator 1.

The multiplying device also includes an add-shift unit 10 whose first input 11 is connected to the output of the multiplicand reducer 6, whose second input 12 is connected to the output of the inverter 4, and whose third input 13 is connected to the second output of the multiplier generator 1. The output of the add-shift unit 10 is coupled to a product bus 14.

The multiplier generator 1 has a first OR-gate unit 15 (FIG. 2), a first input 16 of which is connected to the input 2 of the multiplier generator 1.

The multiplier generator 1 also includes a shift unit 17 having its input 18 connected to the output of the first OR-gate unit 15 and its first output connected to a second input 19 of the first OR-gate unit 15.

The multiplier generator 1 further comprises a shift register 20 whose input 21 is connected to the second output of the shift unit 17 and whose output is connected to that of the multiplier generator 1.

Figure 3:
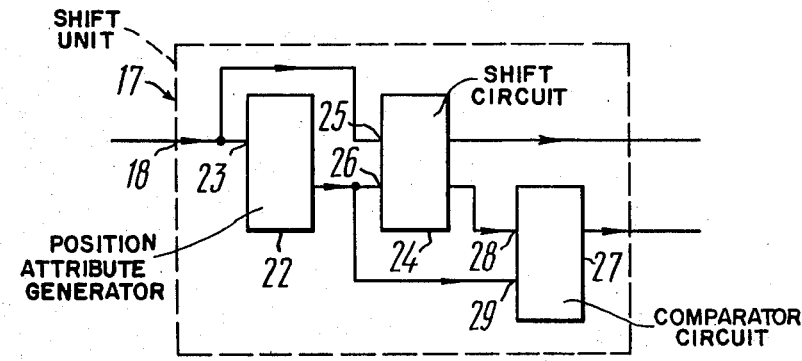
FIG. 3 is a block diagram of the first shift unit, according to the invention.

The shift unit 17 includes a position attribute generator 22 (FIG. 3) having its input 23 connected to the input 18 of the shift unit 17.

The shift unit 17 also comprises a shift circuit 24 having its first input 25 connected to the input 18 of the shift unit 17 and its second input 26 connected to the output of the position attribute generator 22.

The shift unit 17 further comprises a comparator circuit 27 having its first input 28 connected to the first output of the shift circuit 24 and its second input 29 connected to the output of the position attribute generator 22. The output of the comparator circuit 27 is associated with the second output of the shift unit 17, the first output of which is connected to the second output of the shift circuit 24.

Figure 4:
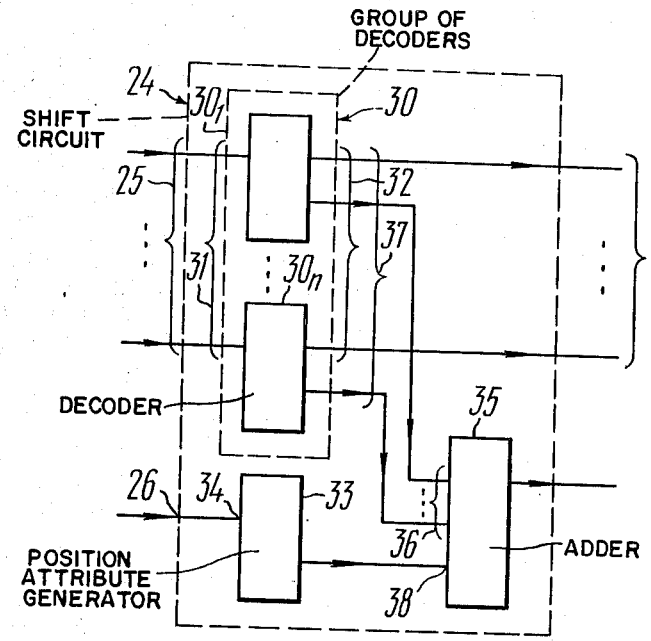
FIG. 4 is a block diagram of the shift circuit, according to the invention.

The shift circuit 24 comprises a group 30 (FIG. 4) of decoders $30_1, \ldots, 30_n$, whose input 31 is connected to the first input 25 of the shift circuit 24 and whose first output 32 is connected to the second output of the shift circuit 24.

The shift circuit 24 also comprises a position attribute decoder 33 having its input 34 coupled to the second input 26 of the shift circuit 24.

The shift circuit further includes an adder 35 having its first input 36 connected to the second output 37 of the group 30 of decoders, its second input 38 connected to the output of the position attribute decoder 33 and its output connected to the second output of the shift circuit 24.

The add-shift unit 10 (FIG. 5) includes a modulo adders unit 39 with its first input 40 being connected to the first input 11 of the add-shift unit 10.

The add-shift unit 10 also comprises an OR-gate unit 41 having its first input 42 connected to the output of the modulo adders unit 39.

Another element of the add-shift unit 10 is a first AND-gate unit 43 whose first input 44 is coupled to the second input 12 of the add-shift unit 10 and whose output is connected to the second input 45 of the OR-gate unit 41.

The add-shift unit 10 further comprises a shift unit 46 whose input 47 is connected to the output of the OR-gate unit 41.

The add-shift unit 10 additionally comprises a product register 48 having its input 49 connected to the output of the shift unit 46 and its output connected to a second input 50 of the modulo adders unit 39 and to a second input 51 of the first AND-gate unit 43.

And, finally, the add-shift unit 10 comprises a second AND-gate unit 52 with its first input 53 being connected to the output of the product register 48, its second input 54 being connected to the third input 13 of the add-shift unit 10 and its output being connected to the output of the addshift unit 10.

Figure 6:
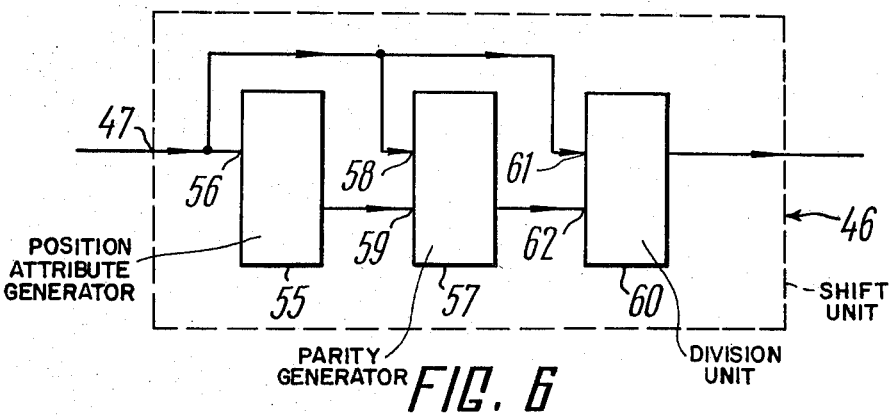
FIG. 6 is a block diagram of the second shift unit, according to the invention.

The shift unit 46 comprises a position attribute generator 55 (FIG. 6) whose input 56 is connected to the input 47 of the shift unit 46.

The shift unit 46 also comprises a parity generator 57 with its first input 58 being connected to the input 47 of the shift unit 46 and its second input 59 being connected to the output of the position attribute generator 55.

The shift unit 46 further comprises a division unit 60 whose first input 61 is connected to the input 47 of the shift unit 46, whose second input 62 is connected to the output of the parity generator 57 and whose output is connected to the output of the shift unit 46.

The position attribute generators 55 and 22 (FIG. 3) are similar.

Figure 7:
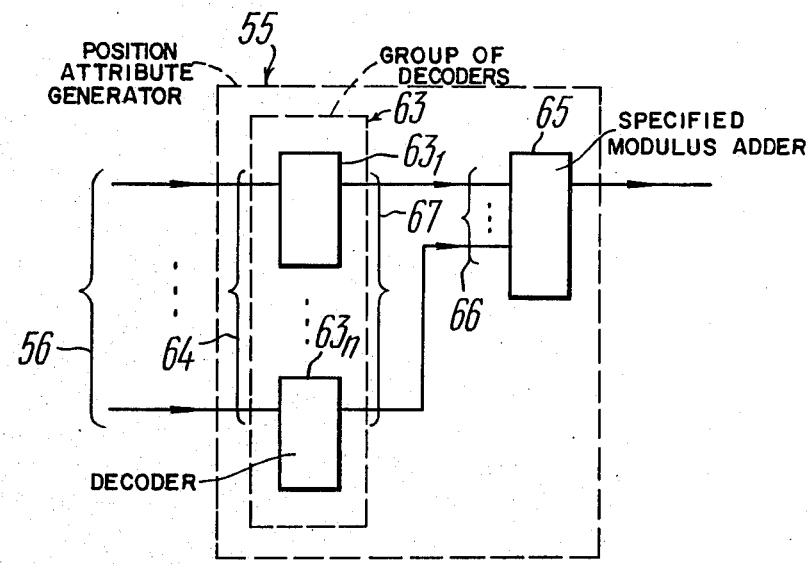
FIG. 7 is a block diagram of the position attribute generator, according to the invention.

The position attribute generator 55 includes a group 63 (FIG. 7) of decoders $63_1, \ldots, 63_n$. An input 64 of the group 63 of decoders is coupled to the input 56 of the position attribute generator 55.

The position attribute generator 55 also includes a specified modulus adder 65 having its input 66 connected to an output 67 of the group 63 of decoders and its output connected to that of the position attribute generator 55.

Figure 8:
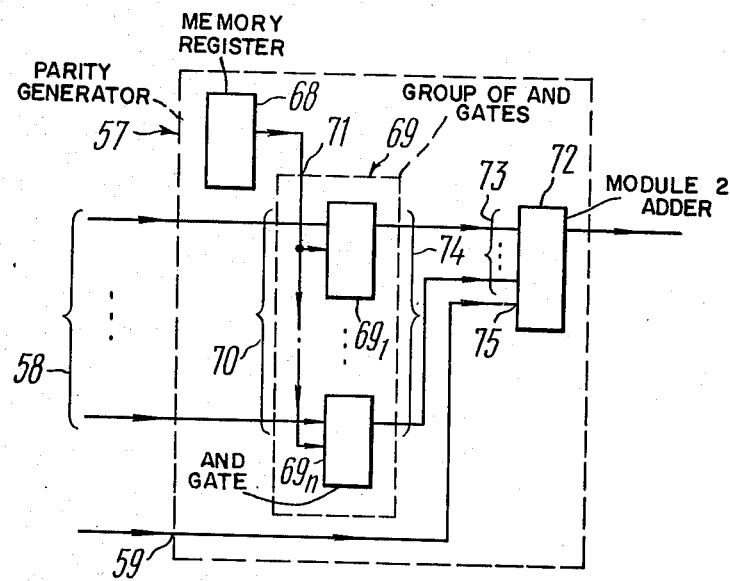
FIG. 8 is a block diagram of the parity generator, according to the invention.

The parity generator 57 (FIG. 8) comprises a memory register 68, a group 69 of AND-gates $69_1, \ldots, 69_n$. One input 70 of the group 69 of AND-gates is connected to the first input 58 of the parity generator 57, while the other input 71 is connected to the output of the memory register 68.

The parity generator 57 also comprises a modulo 2 adder 72 whose first input 73 is coupled to an output 74 of the group 69 of AND-gates, whose second input 75 is connected to the second input 59 of the parity generator 57 and whose output is connected to the output of the parity generator 57.

Figure 9:
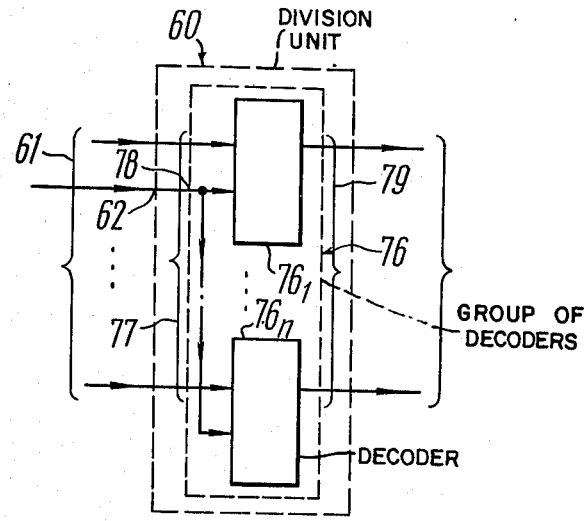
FIG. 9 is a block diagram of the division unit, according to the invention.

The division unit 60 (FIG. 9) comprises a group 76 of decoders $76_1, \ldots, 76_n$. A first input 77 of the group 76 of decoders is coupled to the first input 61 of the division unit 61, while a second input 78 is connected to the second input 62 of the division unit 60, and an output 79 is connected to the output of the division unit 60.

The proposed multiplying device operates as follows.

A multiplier B represented in the system of residual classes in the form $B = (\beta_1, \beta_2, \ldots, \beta_n)$, wherein $B = \beta_i \bmod p_i$ with $i = 1, 2, \ldots, n$, is applied from the multiplier bus 3 (FIG. 1) to the input 2 of the multiplier generator 1. The latter forms the value of another multiplier B', depending on the value of the multiplier B, in a binary number system, which value is associated with that of the multiplier B by the following relationship:

$$B' = B/P$$

wherein P is the limit value of the number system range.

It should be noted here that the value of the new multiplier B' is a proper fraction in the binary system and, therefore, can be written as follows:

$$B' = 0, \beta'_{-1}\beta'_{-2}\beta'_{-3} \ldots \beta'_{-m}$$

or $$B' = 2^{-1} \cdot \beta'_{-1} + 2^{-2} \cdot \beta'_{-2} + \ldots + 2^{-m} \cdot \beta'_{-m},$$

wherein $\beta'_{-i} = \{0,1\}$ with $i = 1,2,\ldots,m$.

A multiplicand A represented in the system of residual classes in the form $A = (\alpha_1, \alpha_2, \ldots \alpha_n)$, wherein $A = \alpha_i \bmod p_i$ with $i = 1,2,\ldots,n$, is applied from the multiplicand bus 8 to the first input 7 of the multiplicand reducer 6. In this case, the multiplicand A goes from the output of the multiplicand reducer 6 to the first input 11 of the add-shift unit 10 if the sunsequent value of the binary digit $\beta'_{-i}$ of the multiplier $\beta'$ is unity, i.e. $\beta'_{-i} = 1$.

The value of the binary digit $\beta'_{-i}$ is applied to the second input 9 of the multiplicand reducer 6.

If the subsequent value of the binary digit $\beta'_{-i}$ of the factor B $\beta'$ is 0, the multiplicand A is not sent to the output of the multiplicand reducer 6. In this case, applied to the second input 12 of the add-shift unit 10 from the output of the inverter 4 is the inverted value of the digit $\beta'_{-i}$ equal to $\overline{\beta}'_{-i} = 1$. At the second input 12 of the add-shift unit 10, the signal $\overline{\beta}'_{-i} = 1$ controls the operation of this unit without the multiplicand A being applied to its first input 11.

After the last (mth) binary digit $\beta'_{-1}$ having been applied to the second input 9 of the multiplicand reducer 6 and to the input 5 of the inverter 4, a control signal is applied from the second output of the multiplier generator 1 to the third input 13 of the add-shift unit 10. Following this signal, the product C of multiplying the multiplicand A by the multiplier B is sent from the output of the add-shift unit 10 to the product bus 14.

The above-described operation of the multiplying device can be illustrated as follows.

Suppose we want to find the product C' of multiplying the multiplicand A by the multiplier B according to the formula:

$$C' = A \cdot B / P$$

Let us denote by B' of the new value of the attribute B after the number B/P has been decomposed into a proper binary fraction. This is possible since $B/P < 1$ which, in turn, is due to $B < P$.

Then, $$B' = 0, \beta'_{-1} \beta'_{-2}, \ldots, \beta'_{-m} \quad (11)$$

or $$B' = \beta'_{-1} \cdot 2^{-1} + \beta'_{-2} \cdot 2^{-2} + \ldots + \beta'_{-m} \cdot 2^{-m} \quad (12)$$

Substituting (12) into (7), we obtain:

$$C' = A \cdot B / P = A \cdot b' = A(\beta'_{-1} \cdot 2^{-1} + \beta'_{-2} \cdot 2^{-2} + \ldots + \beta'_{-m} \cdot 2^{-m}) \quad (13)$$

Opening the brackets and transforming (13), we have:

$$C' = 2^{-1}(A \cdot \beta'_{-1} + 2^{-1}(A \cdot \beta'_{-2} + 2^{-1}(\ldots + 2^{-1}(A \cdot \beta'_{-(m-1)} + 2^{-1}(A \cdot \beta'_{-m} + 0))))) \quad (14)$$

From formula (14) for the product C' of multiplying the multiplicand A by the multiplier B it can be seen that the process of obtaining the product C' consists in sending the multiplicand A to the add-shift unit 10, provided $\beta'_{-i} = 1$, while in the case of $\Gamma'_{-i} = 0$, the multiplicand A is not applied to the unit 10. Then, the multiplicand A is added to the subproduct with the resulting sum being thereafter shifted to the right (division by 2). The process of obtaining the product C' of multiplying the multiplicand A by the multiplier B ends in the absence of the digits of binary decomposition of the value of the new multiplier B'.

The multiplier generator 1 operates as follows.

Prior to multiplication, the multiplier B from the input 2 of the multiplier generator 1 is applied via the OR-gate unit 15 (FIG. 2) to the input 18 of the shift unit 17. In the shift unit 17, the multiplier B is multiplied by 2. If the product equal to 2B, is less than the limit value P of the number system range, i.e. if $2B < P$, the first digit $\beta'_{-1}$ of decomposition of the multiplier B into a binary fraction is zero. If the product 2B is greater than or equal to the limit value P of the number system range, i.e. if $2B \geq P$, the first digit $\beta'_{-1}$ of decomposition of the multiplier B into a binary fraction is unity. The formulated law can be illustrated by the following expressions: for example, the value of the new multiplier B' is known, i.e.

$$B' = 0, \beta'_{-1}, \beta'_{-2}, \ldots, \beta'_{-m}$$

It we multiply the right and left sides of equation (11) by two, we obtain $$2B' = \beta'_{-1}, \beta'_{-2}, \beta'_{-2}, \beta'_{-3}, \ldots, \beta'_{-m}, 0 \quad (15)$$

On the other hand, since $B' = B/P$, $2B' = 2B/P$. If we compare (9) and (15), it can be seen that digit $\beta'_{-1}$ which is the integral part of fraction $2B' = \beta'_{-1}, \beta'_{-2}, \beta'_{3}\ldots \beta'_{-m}0$ is equal to unity if $2B \geq P$ and equal to zero if $2B < P$.

The resulting value of the digit $\beta'_{-1}$ is applied from the second output of the shift unit 17 to the input of the shift register 20 in which it is stored.

Obtained at the first output of the shift unit 17 is a value $\overline{B}$ of the reduced multiplier, equal to 2B if $\beta'_{-1}=0$ and $2B - P$ if $\beta'_{-1} = 1$, which value is again applied via the second input 19 of the OR-gate unit 15 to the input of the shift unit 17. In this case, the fraction in binary notation will take the form:

$$2B' - \beta'_{-1} = \overline{B}' = 0, \beta'_{-2}, \beta'_{-3}, \ldots, \beta'_{-m}, 0 \quad (16)$$

The process of shifting will continue until the last digit $\beta'_{-m}$ of the new multiplier B' is obtained.

Thus, as a result of transformations of the multiplier B in the first shift unit 17, stored in the shift register 20 is the value of the new multiplier B' which is applied from the first output thereof to the first output of the multiplier generator 1.

The operation of the shift unit 17 is as follows.

Applied to the input 18 of the shift unit 17 is the multiplier B whose transformed value $\overline{B}$ is again applied from its output to the input 18 of the shift unit 17 via the OR-gate unit 15.

From the input 18 of the shift unit 17, the multiplier B is delivered to the input 23 (FIG. 3) of the position attribute generator 22.

In the position attribute generator 22, the actual value $R_B$ of the position attribute of the multiplier B is calculated and sent therefrom to the input of the shift circuit 24.

From the second output of the shift circuit 24, a transformed value $\overline{B}$ is derived according to the rule $$2B = \overline{B} \bmod P, \quad (17)$$

which value is then applied to the first output of the shift unit 17. A rated value $\overline{R}_B$ of the position attribute is obtained at the first output of the shift circuit 24, which is applied to the first input 28 of the comparator circuit 27.

In the comparator circuit 27, the rated value $\overline{R}_B$ of the position attribute is compared with its actual value $R_B$ arriving at the input 29 from the output of the position attribute generator 22. If $\overline{R}_B = R_B$, a signal corresponding to zero is produced at the output of the comparator circuit 27, and if $\overline{R}_B \neq R_B$, a signal corresponding to unity is produced at the same output of the comparator circuit 27.

The signals corresponding to zero and unity are applied to the second output of the shift unit 17.

The shift circuit 24 operates as follows.

The number to be shifted, e.g. the multiplier B, is applied from the first input 25 of the shift circuit 24 to the input 31 (FIG. 4) of the group 30 of decoders. Each decoder $30_1, \ldots, 30_n$ of the group 30 transforms a respective value of the residue $\beta_1, \ldots, \beta_n$ of the factors B into a value $\overline{\beta}_1, \ldots, \overline{\beta}_n$ according to the rule $$\overline{\beta}_i = 2\beta_i \bmod P_i \qquad (18)$$

with $i = 1, 2, \ldots, n$.

The value $\overline{\beta}_i$ is derived at the first output of a respective one of the decoders $30_1, \ldots, 30_n$ and applied to the second output of the shift circuit 24.

At the second output of each one of the decoders $30_1, \ldots, 30_n$, there is derived a value $\epsilon_i$ according to the rule $$\epsilon_i = \begin{cases} \tau_i, & \text{if } 2\beta_i \geq p_i \\ 0, & \text{if } 2\beta_i < p_i \end{cases}$$

wherein $\tau_i$ is a number system constant with $i = 1, 2, \ldots, n$.

The values $\epsilon_i$ are applied to the first input 36 of the adder 35.

The value $R_B$ of the position attribute of the multiplier B is applied from the second input 26 of the shift circuit 24 to the input 34 of the position attribute decoder 33, from the output whereof the doubled value $R_B$ is applied to the second input 38 of the adder 35.

At the output of the adder 35, there is derived a rated value $\overline{R}_B$ of the position attribute of the multiplier B, which value is applied to the first output of the shift circuit 24. The rule in accordance with which the rated value $\overline{R}_B$ is derived can be described by the formula:

$$\overline{R}_B = 2R_B + \sum_{i=1}^{n} \epsilon_i \qquad (19)$$

The add-shift unit 10 (FIG. 1) operates as follows. If the value of digit $\beta'_{-i}$ of decomposition of the multiplier B is unity, the multiplicand A from the multiplicand bus 8 passes through the multiplicand reducer 6 to the first input 11 of the add-shift unit 10. From the first input 11 of the add-shift unit 10, the multiplicand A is applied to the first input 40 (FIG. 5) of the modulo adders unit 39, the second input 50 whereof receives the subproduct from the output of the product register 48. The resulting sum is delivered from the output of the modulo adders unit 39 via the OR-gate unit 41 to the input 47 of the shift unit 46 wherein the sum is shifted to the left (the sum is divided by two). The result of shifting of the sum is applied from the output of the shift unit 46 to the product register 48 and stored therein.

If the value of digit $\beta'_{-i}$ of decomposition of the multiplier B is zero, the multiplicand A from the multiplicand bus 8 (FIG. 1) does not pass through the multiplicand reducer 6 and is not applied to the first input 11 of the add-shift unit 10. However, in this case, the inverted value of digit $\beta'_{-i}$, which is equal to unity, is applied from from the output of the inverter 4 to the second input 12 of the add-shift unit 10. From the second input 12 of the unit 10, the inverted value of digit $\beta'_{-i}$ is applied to the first input 44 (FIG. 5) of the first AND-gate unit, whereby the subproduct passes from the output of the product register 48 to the second input 45 of the OR-gate unit 41 bypassing the modulo adders unit 39.

After the last (mth) digit $\beta'_{-i}$ has been applied from the first output of the multiplier generator 1 (FIG. 1), a control signal appears at its second output, which is applied to the third input 13 of the add-shift unit 10.

The control signal from the third input 13 of the add-shift unit 10 is applied to the second input 54 (FIG. 5) of the second AND-gate unit 52, whereby the product C of multiplication is allowed to pass from the output of the product register 48 via the first input 53 of the second AND-gate unit 52 to the output of the add-shift unit 10.

The shift uniit 46 operates in the following manner.

Let us denote the sum from the output of the modulo adders unit 39 by S or in the system of residual classes $$S = (s_1, s_2, \ldots, s_n)$$

Then the sum S from the input 47 of the shift unit 46 goes to the input 56 (FIG. 6) of the position attribute generator 55. The position attribute $R_S$ of the sum S is applied from the output of the position attribute generator 55 to the second input 59 of the parity generator 57 whose first input 58 receives the sum S from the input 47 of the shift unit 46.

Let us denote the signal at the output of the parity generator 57 by $\psi(S)$ with $\psi(S) = 1$ if the sum S is odd and $\psi(S) = 0$ if the sum S is even. Then, the value (S) of parity of the sum S is applied to the second input 62 of the division unit 60 whose first input 61 receives the sum S from the input 47 of the shift unit 46. From the output of the division unit 60, the sum S shifted one information bit to the right is applied to the output of the shift unit 46.

The position attribute generators 22 (FIG. 3) and 55 (FIG. 6) operate in a similar fashion. Therefore, we shall consider only the operation of the position attribute generator 55 shown in FIG. 6.

Each one of the decoders $63_1, \ldots, 63_n$ (FIG. 7) of the group 63 of decoders transforms, respectively, the residues $s_1, \ldots, s_n$ of the sum S applied from the input 56 of the position attribute generator 55 into values $Q_1 \cdot s_1, \ldots, Q_n \cdot s_n$, wherein $Q_i$ is a number system constant with $i = 1, 2, \ldots, n$. The values $Q_1 \cdot s_1, \ldots, Q_n \cdot s_n$ are applied from the outputs of the decoders $63_1, \ldots, 63_n$ to the input 66 of the specified modulus adder 65.

At the output of the adder 65, there is derived the desired value $R_S$ of the position attribute of the sum S according to the rule:

$$R_S = Q_1 \cdot s_1 + Q_2 \cdot s_2 + \ldots + Q_n \cdot s_n \bmod R_P \qquad (20)$$

which value is applied to the output of the position attribute generator 55. Here, $R_P$ is a number system constant.

The parity generator 57 (FIG. 6) operates as follows.

The residues $s_1, \ldots, s_n$ of the sum S, applied to the first input 58 of the parity generator 57, pass or do not pass through respective AND-gates $69_1, \ldots, 69_n$ (FIG. 8) of the group 69 of AND-gates, depending on signals fed from the output of the memory register 68 to their second inputs.

The signals from the outputs of the AND gates $69_1, \ldots, 69_n$ are applied to the first input 73 of the modulo 2 adder 72 whose second input 75 receives the position attribute $R_S$ of the sum S from the second input 59 of the parity generator 57. At the output of the modulo 2 adder 72, there is obtained the desired value $\psi(S)$ of parity of the sum S.

The division unit 60 (FIG. 6) operates in the following fashion.

The sum S from the first input of the unit 60 is applied to the first input of the group 76 of decoders, the second input 78 of the latter receiving from the second input 62 of the division unit 60 the value $\psi(S)$ of parity of the sum S. Each one of the decoders $76_1, \ldots, 76_n$ transforms the input values of the residues $s_1, \ldots, s_n$ of the sum S into the the value $\psi(S)$ of parity of the sum S into values $s'_1, \ldots, s'_n$ in accordance with the rule:

$$s'_i = (s_i - \psi(S)/2) \bmod p_i \quad (21)$$

the latter values being applied to the output of the division unit 60.

Thus, the operation of multiplication of the multiplicand A by the multiplier B is performed, in the proposed multiplying device, as follows.

First, the multiplier B is applied from the multiplier bus 3 to the input 2 (FIG. 1) of the multiplier generator 1, wherein, with the aid of the shift unit 17 (FIG. 2), a new value B' of the multiplier is formed in the shift register 20, which can be represented as:

$$B' = 0, \beta'_{-1}\beta'_{-2} \ldots \beta'_{-m},$$

the values of digits $\beta'_{-i}$ of the new multiplier $\beta'$ being, in this case, used for controlling the operations of multiplication.

Figure 5:
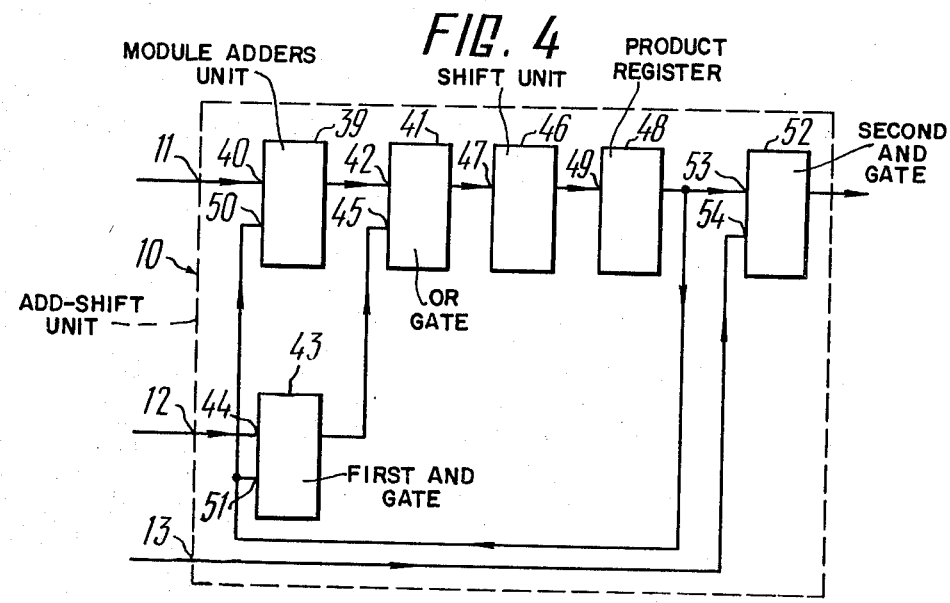
FIG. 5 is a block diagram of the add-shift unit, according to the invention.

Namely, if $\beta'_{-i} = 1$, the multiplicand A from the multiplicand bus 8 (FIG. 1) is applied via the multiplicand reducer 6 to the first input 11 of the add-shift unit 10. In the odd shift unit 10, the multiplicand A is added to the subproduct which is stored in the product register 48 (FIG. 5). The resulting sum is applied from the output of the modulo adders unit 39, via the OR-gate unit 41, to the input 47 of the shift unit 46. The sum shifted one information bit to the right is stored in the product register 48.

And if $\beta'_{-i} = 0$, the multiplicand A is not applied to the first input 11 of the add-shift unit 10. In this case, the subproduct from the output of the product register 48 is applied via the OR-gate unit 41 to the input of the shift unit 48. The shifted subproduct is also stored in the product register 48.

Figure 2:
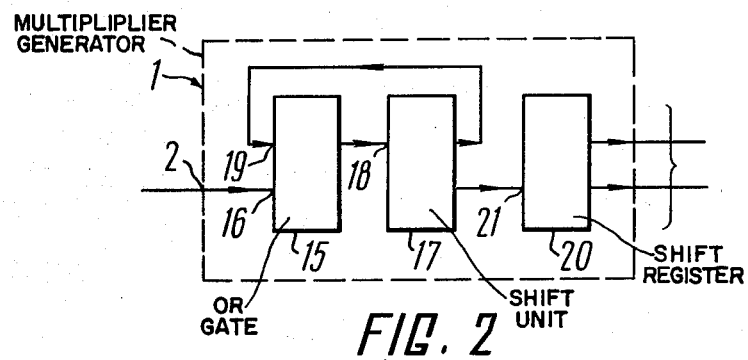
FIG. 2 is a block diagram of the multiplier generator, according to the invention.

The operation of multiplication ends with no digits of the new multiplier $\beta'$ being present in the shift register 20 (FIG. 2). Therewith, a control signal is produced at the second output of the multiplier generator 1 (FIG. 1), which signal is applied to the third input 13 of the add-shift unit 10. In this case, the product from the product register 48 (FIG. 5) is applied via the second AND-gate unit 52 to the product bus 14 (FIG. 1).

The proposed invention permits the development of a basically new class of computers operating in the system of residual classes, in particular, the proposed multiplying device enables multiplication of any numbers represented in the system of residual classes.

What is claimed is:

1. A multiplying device comprising: a multiplicand bus; a multiplier bus; a product bus; a multiplier generator for sequential generation of a multiplier;

an input and outputs of said multiplier generator;

said input of said multiplier generator being connected to said multiplier bus;

an inverter; an input and an output of said inverter;

said input of said inverter being connected to said first output of said multiplier generator;

a multiplicand reducer for reducing the multiplicand to the required form;

a first and a second input and an output of said multiplicand reducer;

said first input of said multiplicand reducer being connected to said multiplicand bus;

an add-shift unit for obtaining the product;

a first, a second and a third input and an output of said add-shift unit;

said first input of said add-shift unit being connected to said output of said multiplicand reducer;

said second input of said add-shift unit being connected to said output of said inverter for controlling the operations of addition and shifting of the multiplicand as well as the product, both being represented in the system of residual classes;

said third input of said add-shift unit being connected to said second output of said multiplier generator for controlling transfer of the product to said product bus;

said output of said add-shift unit being connected to said product bus;

said second input of said multiplicand reducer being connected to said output of said multiplier generator for the multiplicand represented in the system of residual classes to be transferred to said add-shift unit.

2. A multiplying device as claimed in claim 1, wherein said multiplier generator comprises:

an OR-gate unit;

a first and a second input and an output of said OR-gate unit;

said first input of said OR-gate unit being connected to said input of said multiplier generator;

a shift unit for shifting the multiplier one information bit to the left;

an input and outputs of said shift unit;

said input of said shift unit being connected to said output of said OR-gate unit;

said first output of said shift unit being connected to said second input of said OR-gate unit;

a shift register for shifting the reduced multiplier;

an input and outputs of said shift register;

said input of said shift register being connected to said second output of said shift unit;

said outputs of said shift register being connected to said output of said multiplier generator.

3. A multiplying device as claimed in claim 2, wherein said shift unit comprises: p1 a position attribute generator;

an input and an output of said position attribute generator;

said input of said position attribute generator being connected to said input of said shift unit;

a shift circuit for shifting the multiplier one information bit to the left with the aid of the position attribute;

a first and a second input and an output of said shift circuit;

said first input of said shift circuit being connected to said input of said shift unit;

said second input of said shift circuit being connected to said output of said position attribute generator;

a comparator circuit for producing a control signal in accordance with the position attribute;

a first and a second input and an output of said comparator circuit;

said first input of said comparator circuit being connected to said first output of said shift circuit;

said second input of said comparator circuit being connected to said output of said position attribute generator;

said output of said comparator circuit being connected to said second output of said shift unit;

said first output of said shift unit being connected to said second output of said shift circuit.

4. A multiplying device as claimed in claim 3, wherein said shift circuit comprises:

a group of decoders;

an input and outputs of said group of decoders;

said input of said group of decoders being connected to said first input of said shift circuit;

said first output of said group of decoders being connected to said second output of said shift circuit;

a position attribute decoder;

an input and an output of said position attribute decoder;

said input of said position attribute decoder being connected to said second input of said shift circuit;

an adder;

a first and a second input and an output of said adder;

said first input of said adder being connected to said second output of said group of decoders;

said second input of said adder being connected to said output of said position attribute decoder;

said output of said adder being connected to said first output of said shift circuit.

5. A multiplying device as claimed in claim 1, wherein said add-shift unit comprises:

a modulo adders unit for addition of the multiplicand to the subproduct, both being represented in the system of residual classes;

inputs and an output of said modulo adders unit;

a first input of said modulo adders unit being connected to said first input of said add-shift unit; an OR-gate unit;

a first and a second input and an output of said OR-gate unit;

said first input of said OR-gate unit being connected to said output of said modulo adders unit;

a first AND-gate unit;

a first and a second input and an output of said first AND-gate unit;

said first input of said first AND-gate unit being connected to said second input of said add-shift unit;

said output of said first AND-gate unit being connected to said second input of said OR-gate unit;

a shift unit for shifting the subproduct one information bit to the right;

an input and an output of said shift unit;

said input of said shift unit being connected to said output of said OR-gate unit;

a product register for storing the subproduct and product;

an input and an output of said product register;

said input of said product register being connected to said output of said shift unit;

said output of said product register being connected to said second inputs, of said modulo adders unit and said first AND-gate unit;

a second AND-gate unit;

a first and a second input and an output of said second AND-gate unit;

said first input of said second AND-gate unit being connected to said output of said product register;

said second input of said second AND-gate unit being connected to said third input of said add-shift unit;

said output of said second AND-gate unit being connected to said output of said add-shift unit.

6. A multiplying device as claimed in claim 5, wherein said shift unit comprises:

a position attribute generator for calculating the position marker of the partial result of multiplication;

an input and an output of said position attribute generator;

said input of said position attribute generator being connected to said input of said shift unit;

a parity generator for determining the parity of the subproduct;

a first and a second input and an output of said parity generator;

said first input of said parity generator being connected to said input of said shift unit;

said second input of said parity generator being connected to said output of said position attribute generator;

a division unit for dividing the subproduct by the factor of 2;

a first and a second input and an output of said division unit;

said first input of said division unit being connected to said input of said shift unit;

said second input of said division unit being connected to said output of said parity generator;

said output of said division unit being connected to said output of said shift unit.

7. A multiplying device as claimed in claim 3, wherein said position attribute generator comprises:

a group of decoders;

an input and an output of said group of decoders;

said input of said group of decoders being connected to said input of said position attribute generator;

a specified modulus adder;

an input and an output of said specified modulus adder;

said input of said specified modulus adder being connected to said output of said group of decoders;

said output of said specified modulus adder being connected to said output of said position attribute generator.

8. A multiplying device as claimed in claim 6, wherein said position attribute generator comprises:

a group of decoders;

an input and an output of said group of decoders;

said input of said group of decoders being connected to said input of said position attribute generator;
a specified modulus adder;
an input and an output of said specified modulus adder;
said input of said specified modulus adder being connected to said output of said group of decoders;
said output of said specified modulus adder being connected to said output of said position attribute generator.

9. A multiplying device as claimed in claim 6, wherein said parity generator comprises:
a memory register for storing the number system constants;
an output of said memory register;
a group of AND-gates;
a first and a second input and an output of said group of AND-gates;
said first input of said group of AND-gates being connected to said first input of said parity generator;
said second input of said group of AND-gates being connected to said output of said memory register;
a modulo 2 adder;
a first and a second input and an output of said modulo 2 adder;
said first input of said modulo 2 adder being connected to said output of said group of AND-gates;
said second input of said modulo 2 adder being connected to said second input of said parity generator;
said output of said modulo 2 adder being connected to said output of said parity generator.

* * * * *